United States Patent
Evans

(10) Patent No.: US 7,705,511 B2
(45) Date of Patent: Apr. 27, 2010

(54) MAIN ELEMENT FOR AN ELECTRICAL MACHINE

(75) Inventor: Steven Andrew Evans, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 589 days.

(21) Appl. No.: 11/659,838

(22) PCT Filed: Jun. 30, 2005

(86) PCT No.: PCT/EP2005/053099
§ 371 (c)(1),
(2), (4) Date: Feb. 9, 2007

(87) PCT Pub. No.: WO2006/018346
PCT Pub. Date: Feb. 23, 2006

(65) Prior Publication Data
US 2008/0042511 A1    Feb. 21, 2008

(30) Foreign Application Priority Data
Aug. 12, 2004   (DE) ................... 10 2004 039 180

(51) Int. Cl.
    *H02K 1/00*    (2006.01)
(52) U.S. Cl. .................... 310/216.074; 310/216.069
(58) Field of Classification Search ............. 310/216, 310/216.061–216.067, 216.012, 216.034, 310/216.305, 216.074, 216.079, 216.086, 310/216.088, 216.102, 216.111, 261.1, 263
See application file for complete search history.

(56) References Cited

U.S. PATENT DOCUMENTS

| 7,567,010 | B1 * | 7/2009 | Farnia .................. 310/44 |
| 2004/0007936 | A1 | 1/2004 | Cross et al. |
| 2004/0113511 | A1 * | 6/2004 | Schmidt et al. ........... 310/218 |

FOREIGN PATENT DOCUMENTS

| JP | 2002-233085 | | 8/2002 |
| JP | 2004120958 A | * | 4/2004 |
| WO | WO 02/058210 A1 | | 7/2002 |
| WO | WO 2004/098023 A1 | | 11/2004 |

* cited by examiner

*Primary Examiner*—Quyen Leung
*Assistant Examiner*—Leda Pham
(74) *Attorney, Agent, or Firm*—Ronald E. Greigg

(57) ABSTRACT

A main element which can be used as a rotor or stator for an electrical machine has a short-circuit ring and radially protruding teeth formed integrally onto the short-circuit ring, which teeth are offset from one another about circumferential angles. To make it possible to press a main element of relatively great axial length of SMC material with the required high material density, the SMC body is subdivided into a plurality of separately manufactured modules, placed against one another in axially aligned fashion, two each of which modules are embodied identically and on being placed against one another are rotated 180° in the plane defined by the module axes. Each separately pressed module, to achieve the required density, has a high aspect ratio, and for pressing the plurality of modules, only two press molds are required.

19 Claims, 8 Drawing Sheets

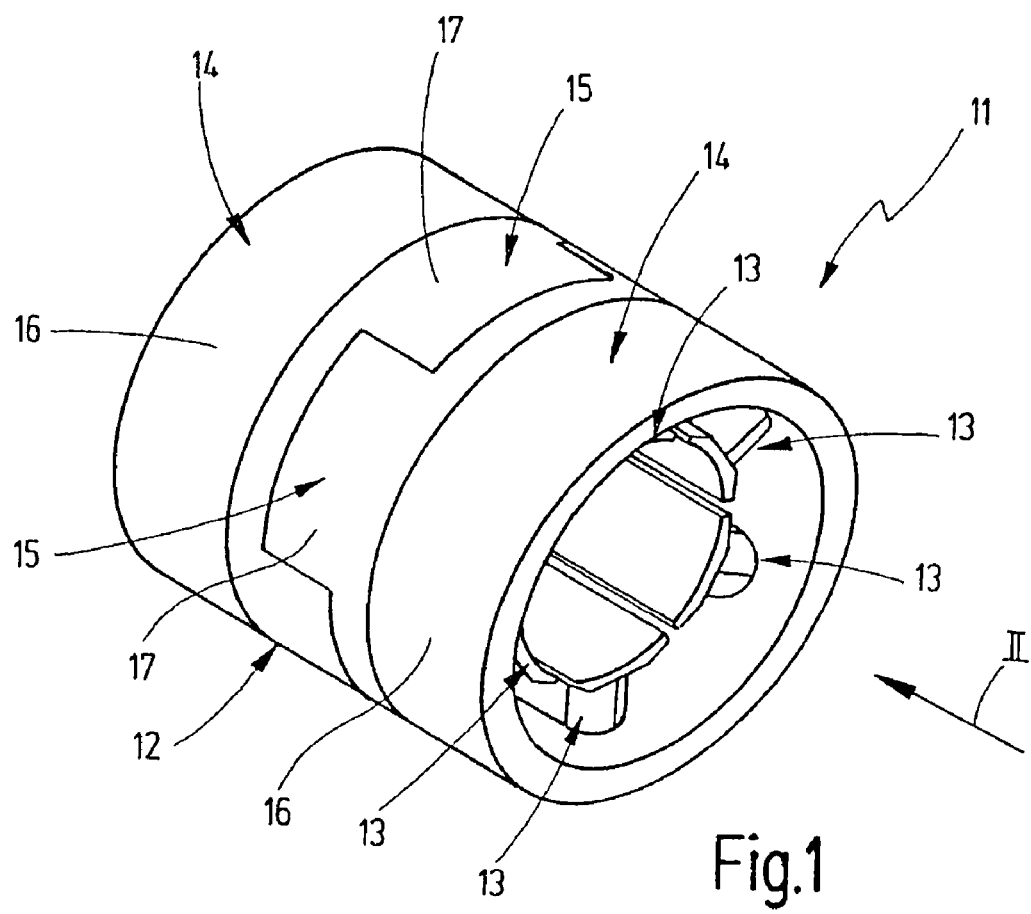
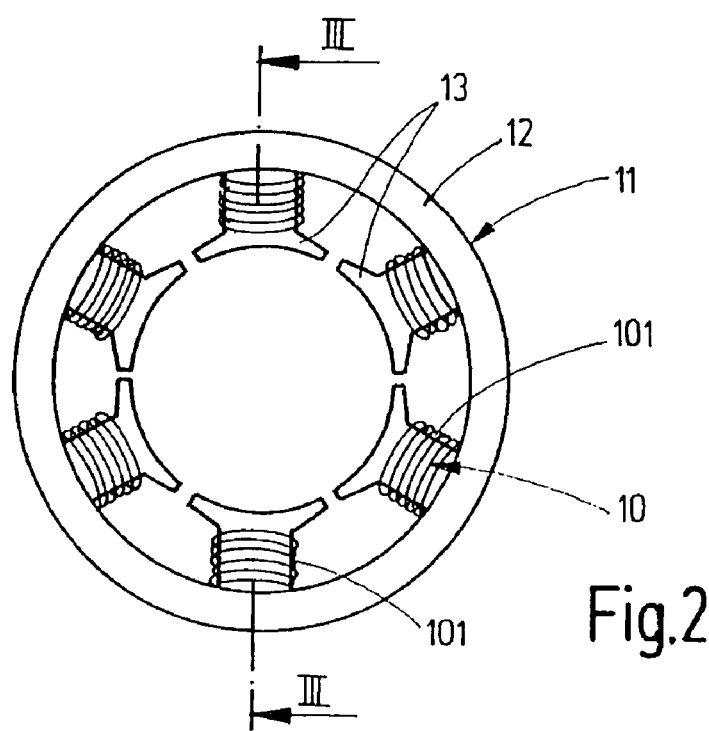

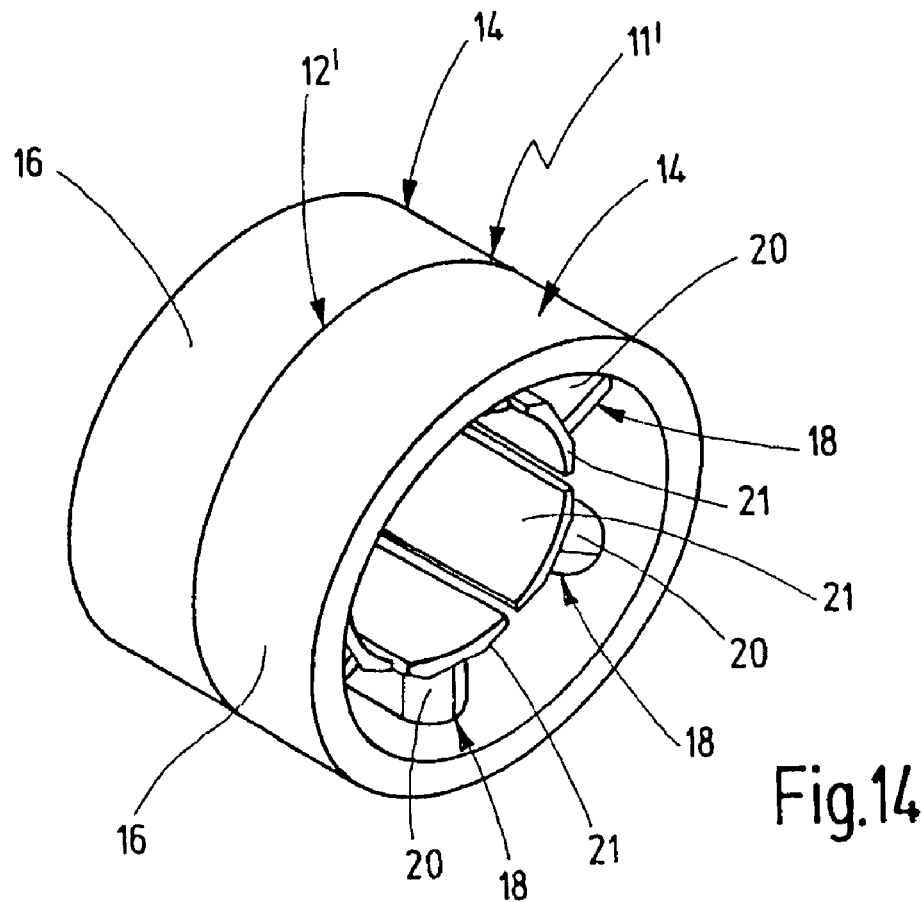
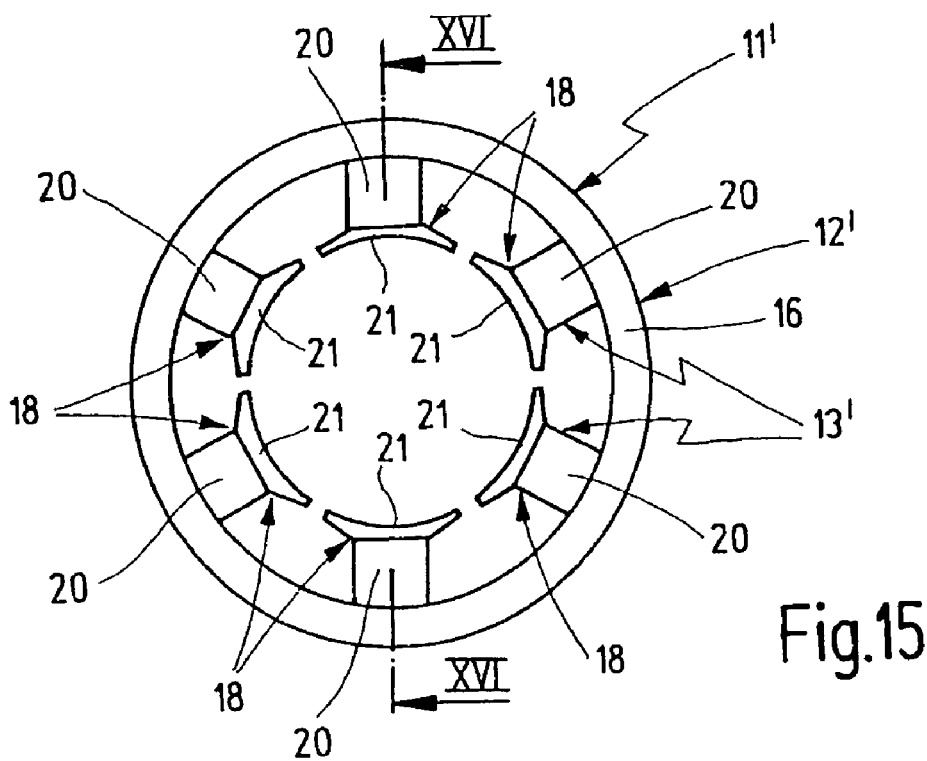

MAIN ELEMENT FOR AN ELECTRICAL MACHINE

CROSS-REFERENCE TO RELATED APPLICATION

This application is a 35 USC 371 application of PCT/EP 2005/053099 filed on Jun. 30, 2005.

BACKGROUND OF THE INVENTION

1. Field of the Invention

The invention is directed to a main element usable as a rotor or stator for an electrical machine, especially for a small DC motor.

2. Description of the Prior Art

The magnetically conductive bodies of stators or rotors in an electrical machine are increasingly being made from SMC (soft magnetic powder iron composite) material and particularly for small DC motors are replacing the laminated iron bodies or lamination packets, since from a production standpoint they are very much easier to manufacture. SMC material moreover offers additional advantages in comparison to stator or rotor bodies of sheet-metal lamination packets, such as reducing iron losses at high frequencies in motors with a high rpm or a large number of poles, improved thermal characteristics because of the use of thin tooth insulators, since the teeth can be pressed without sharp corners and edges, and high flexibility in terms of design of the motor. SMC material is typically pressed into the desired shape of the stator or rotor using a pressing tool and is then heat-treated at a relatively low temperature, for example of up to 500° C. In the pressing, a relatively high density of the material, which comes as close as possible to that of iron (7.8 g/cm$^3$), must be attained. Such a density can be attained only whenever the aspect ratio of the compact is as high as possible. An aspect ratio of 1:15 has been established as a limit value. The term "aspect ratio" is understood to mean the ratio between the smallest dimension of the cross section, extending transversely to the pressing direction, of the compact to the length of the compact in the pressing direction.

To maintain this kind of aspect ratio, in a known multipole stator of SMC material for an internal rotor machine (International Patent Disclosure WO 99/50949), it is known for the outer short-circuit ring, also called a short-circuit yoke, to be composed of a number of annular segments in the circumferential direction that correspond to the number of teeth of the stator. Each annular segment of the short-circuit ring integrally has one stator tooth with a tooth neck and a tooth shoe that is the boundary of the tooth neck on its end remote from the short-circuit ring. Each annular segment with a tooth neck and tooth shoe is produced from SMC material by pressing and heat treatment. The tooth necks are rounded on their axial ends or have an oval profile, so that with the elimination of sharp edges at the tooth necks, only a thin insulating layer has to be applied, onto which the annular coil can then be wound. The individual annular coils of the stator winding are wound directly onto the tooth necks using conventional machine winding technology. Once the annular coils have been wound on, the individual annular segments are placed against one another in the circumferential direction and solidly joined together.

In another known stator of SMC material for an internal rotor machine (WO 00/69047), the short-circuit ring on the one hand and the stator teeth with the tooth neck and tooth shoe on the other are produced separately in the desired form from SMC material. Once the prefabricated annular coils are slipped onto the tooth necks, the stator teeth are inserted by positive engagement, with the ends of the tooth necks remote from the tooth shoe, into prepared recesses in the short-circuit ring and secured to it.

SUMMARY AND ADVANTAGES OF THE INVENTION

The main element of the invention for an electrical machine has the advantage over the prior art that the individual modules manufactured from SMC material on the one hand have a relatively high aspect ratio in the axial pressing direction and can therefore be produced with high material density, and on the other hand, by joining together only a few modules in only two module variants, a long axial length of the main element can be achieved. This enables economical production of small-diameter electrical machines that have a long axial length for the sake of high power, especially in small motors for uses in motor vehicles, such as DC motors for seat adjusters and power windows, or brushless DC motors for direct gasoline injection. Regardless of the number of poles or teeth of the electrical machine, for a rotor or stator of relatively great length only four SMC bodies have to be pressed with only two press molds and then joined together. This number of individual SMC parts is far below the number of SMC components that must be pressed and mounted in the known SMC stators described above in order to attain the finished stator.

In a preferred embodiment of the invention, two identical modules, as outer modules, are disposed on the outside and two identical modules as intermediate modules are disposed between the outer modules. The outer modules are shaped such that when the two intermediate modules are removed, the two outer modules can be attached to one another to make an axially shortened short-circuit ring with integrally formed-on teeth. This has the advantage that the electrical machine of the same design, depending on the power needed, can be made without structural or production-related modifications on the building block principle, with a long or a short axial length and thus with greater or lesser power as needed. To that end, of the modules required for a long machine, only the two intermediate modules have to be omitted in order to attain a machine with a short axial length and correspondingly reduced power.

BRIEF DESCRIPTION OF THE DRAWINGS

The invention is described in further detail herein below, with reference to the drawings, in which:

FIG. 1 is a perspective view of a windingless stator of SMC material of great axial length for an internal rotor motor according to the invention, FIG. 2, a plan view on the stator with the winding already wound onto it, in the direction of the arrow II in FIG. 1;

FIG. 14, a perspective view of the stator in FIG. 13;

FIG. 15, an end view of the stator in FIG. 14;

DESCRIPTION OF THE PREFERRED EMBODIMENT

Figure 3:
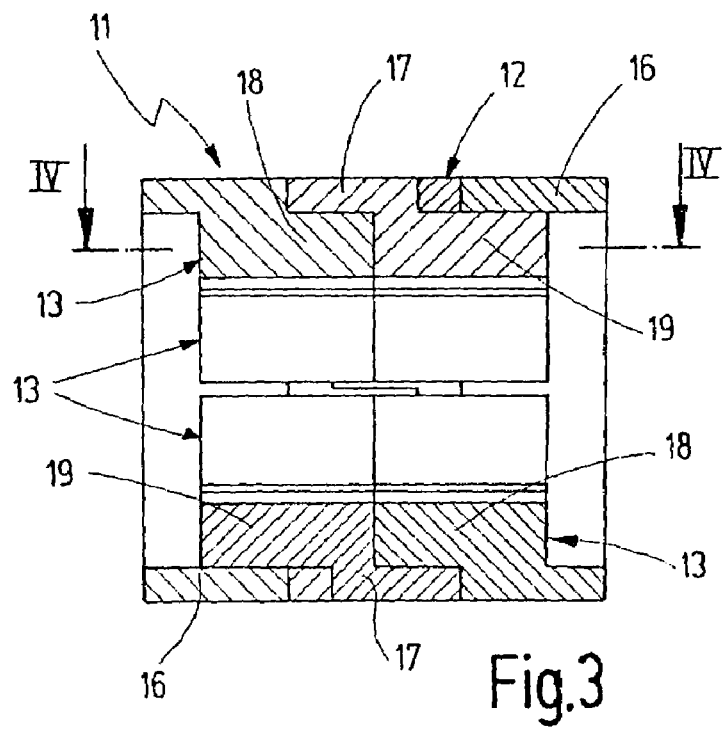
FIG. 3, a section of the windingless stator along the line III-III in FIG. 2.

In FIGS. 1 through 3, a main element, used as a stator, of a three-phase, multipole, for instance four-pole, brushless internal rotor DC motor is shown in perspective, end view and longitudinal section, respectively, as an exemplary embodiment of a main element of an electrical machine. The stator has an SMC body 11, made from magnetically conductive SMC material (soft magnetic powder iron composite), with a short-circuit yoke or short-circuit ring 12 and with radially inward-protruding teeth 13, formed integrally onto the short-circuit ring 12, which are offset from one another by equal circumferential angles, and a stator winding 10, represented schematically in FIG. 2, which is wound in the form of individual annular coils 101 onto the teeth 13. The SMC body 11 comprises a total of four separately fabricated modules, placed against one another in axial alignment, of which two modules each are embodied identically and on being put together are rotated counter to one another by 180° in the plane defined by the module axes. Two identical modules are disposed as outer modules 14 on the outside and two identical modules are disposed as intermediate modules 15 between the outer modules 14. For producing the modules 14, 15, SMC iron powder is pressed in a press mold which predetermines the shape of the outer modules 14 and intermediate modules 15; the pressing is done in the axial direction of the modules 14, 15, followed by heat treatment. The modules 14, 15 are pressed in the process to a density of approximately 7.3 g/cm$^3$ or higher. The heat treatment is effected for instance over approximately 30 minutes in an air atmosphere at a temperature of approximately 500° C. So that the indicated, desired high density of the iron powder in the modules 14, 15 will be attained, each module 14, 15 is shaped such that its aspect ratio does not fall below a limit value of 1:15. The term "aspect ratio" is defined as the ratio between the least dimension of the compact crosswise to the pressing direction to the dimension of the compact in the pressing direction. Since in the modules 14, 15 the pressing of the iron powder is done in the axial direction of the modules 14, 15, the axial length of the individual modules 14, 15 is selected such that the aspect ratio is at no point of the module less than the predetermined minimal ratio.

The modules 14, 15 each have an annular short-circuit element or segment 16 and 17, respectively, and an equal number of module teeth 18, 19, offset by equal circumferential angles on the short-circuit segment 16 and 17, respectively. Each short-circuit segment 16, 17 forms one of four axial portions of the short-circuit ring 12, and the module teeth 18, 19, which protrude on one side past the associated short-circuit segment 16 and 17, form the teeth 13 of the SMC body 11 once the modules 14, 15 are put together. The number of module teeth 18 and 19 on each outer module 14 and intermediate module 15 is half as large as the number of teeth 13 of the SMC body 11.

Figure 8:
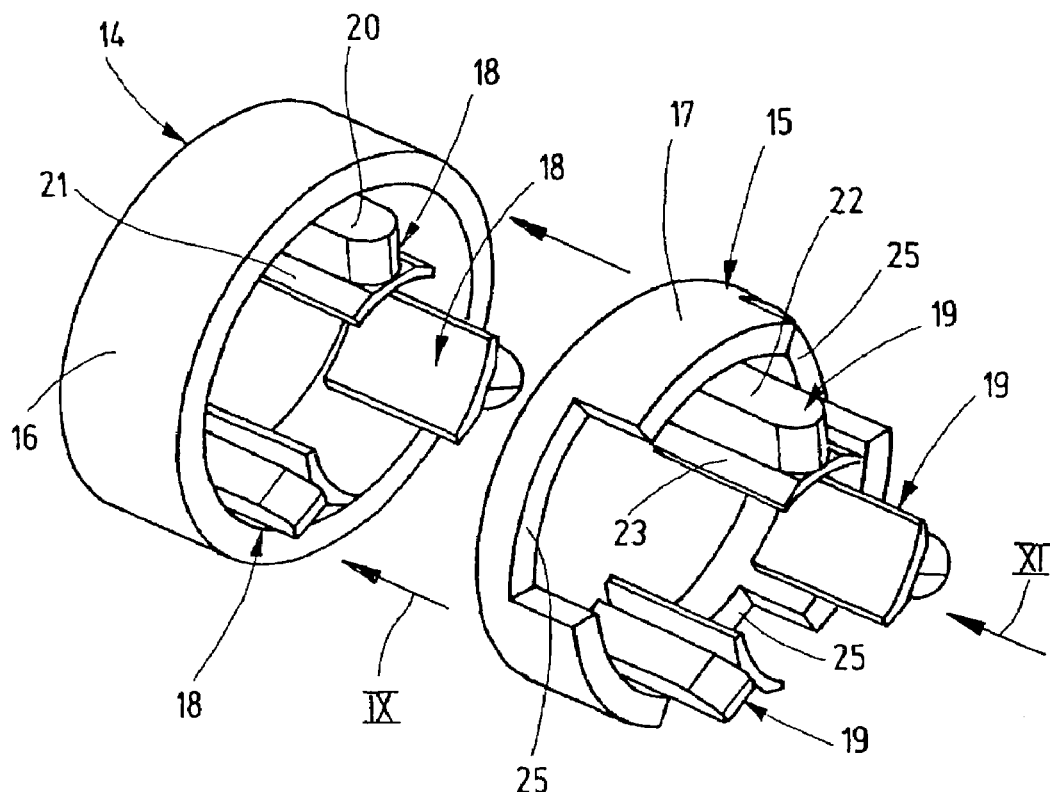
FIG. 8, an exploded view of a stator half in FIG. 5.
Figure 9:
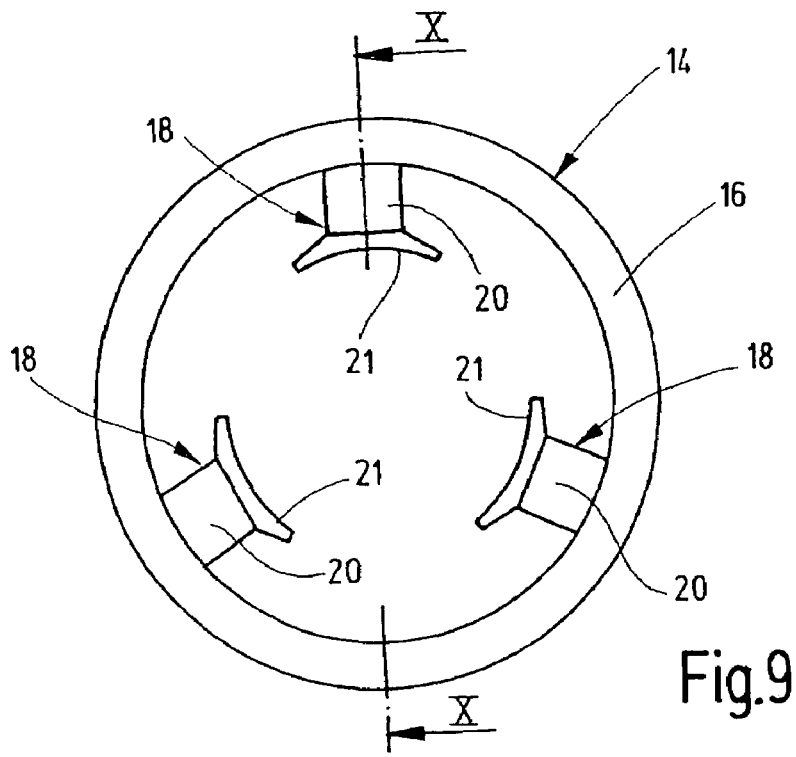
FIG. 9, an end view of the left-hand module in FIG. 8, in the direction of the arrow IX.
Figure 10:
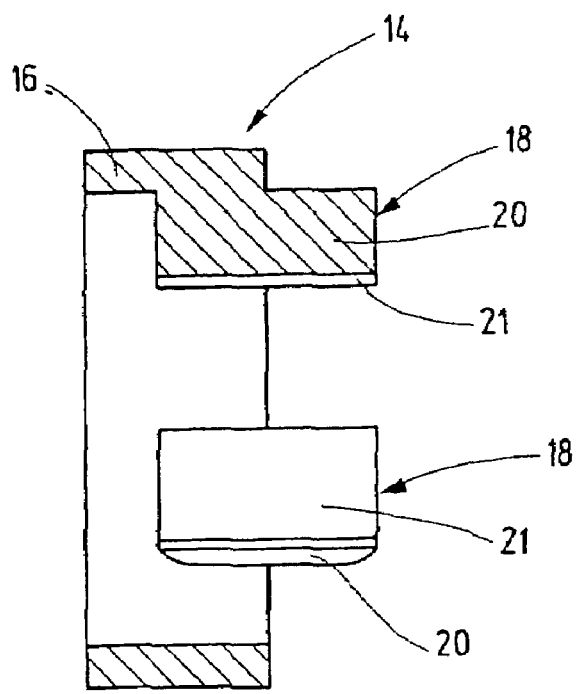
FIG. 10, a section taken along the line X-X in FIG. 8.
Figure 11:
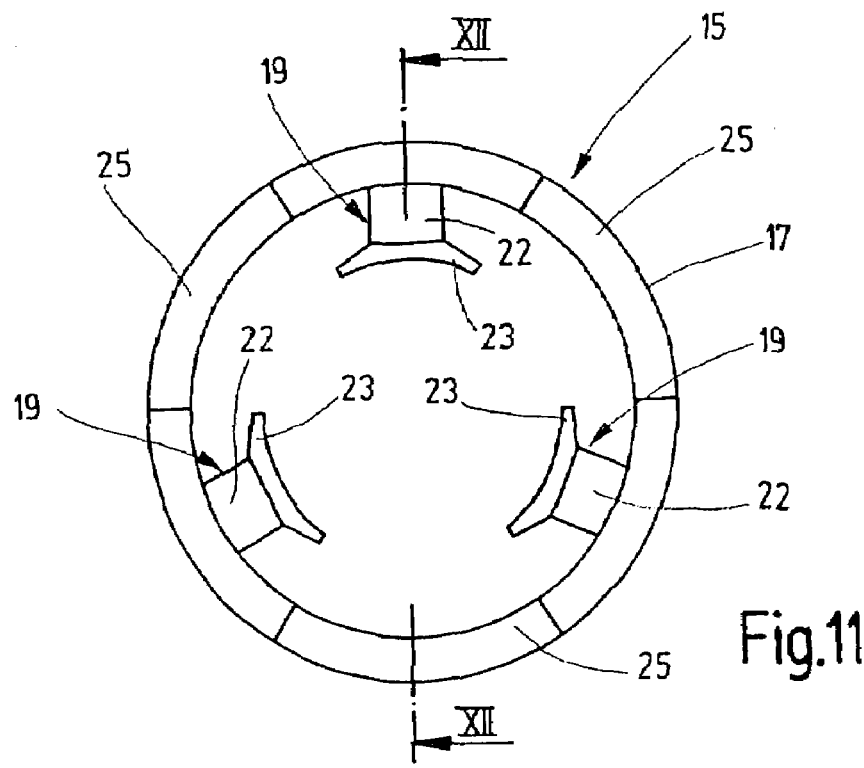
FIG. 11, an end view of the left-hand module in FIG. 8, in the direction of the arrow XI.
Figure 12:
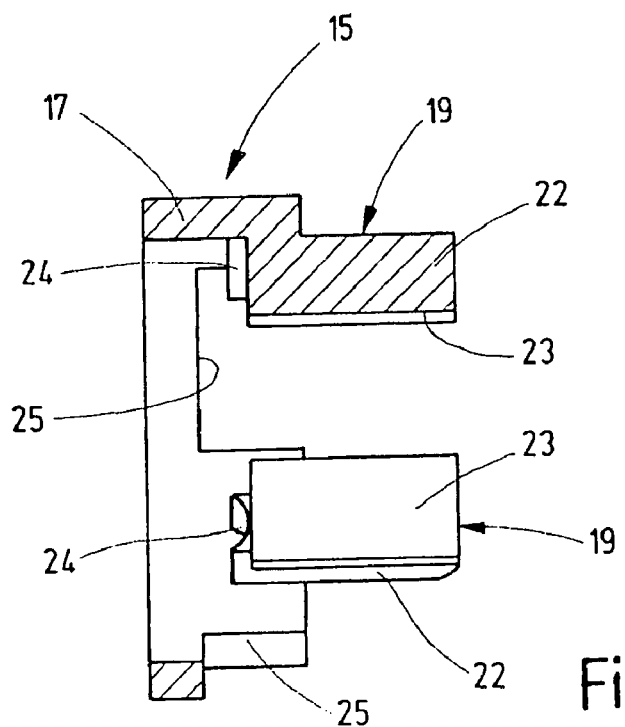
FIG. 12, a section taken along the line XII-XII in FIG. 11.
Figure 13:
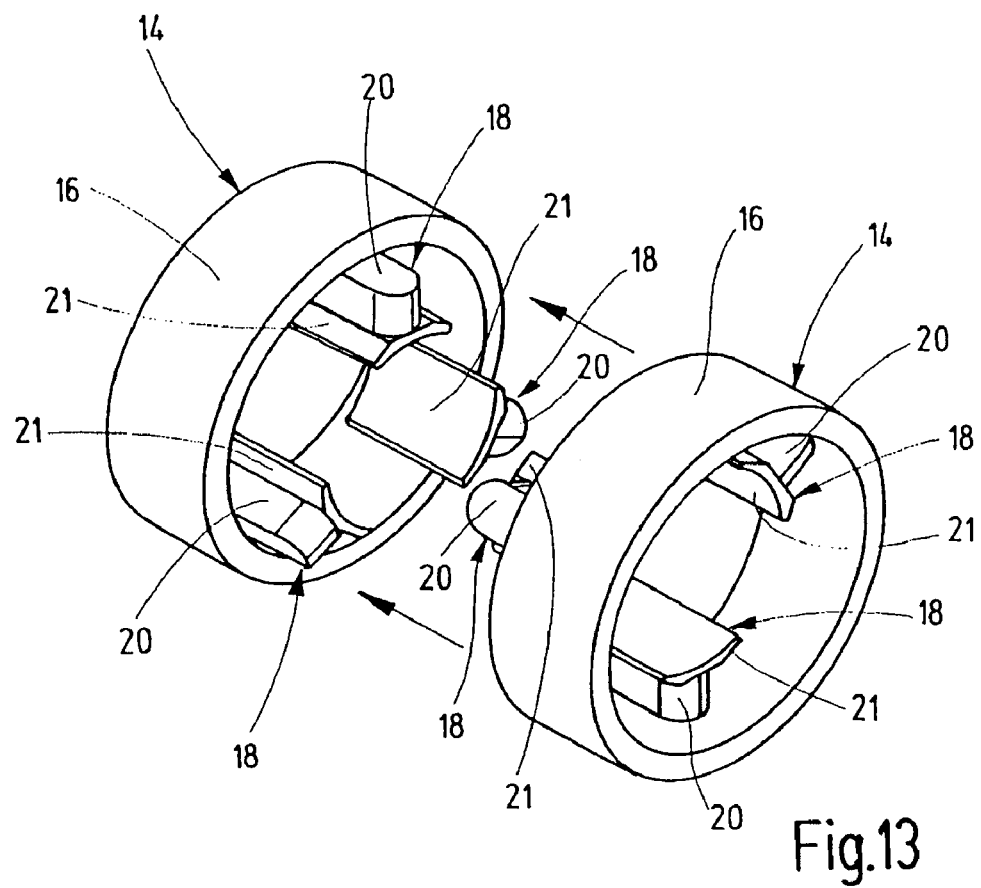
FIG. 13, an exploded view of a windingless stator of shortened axial length.
Figure 16:
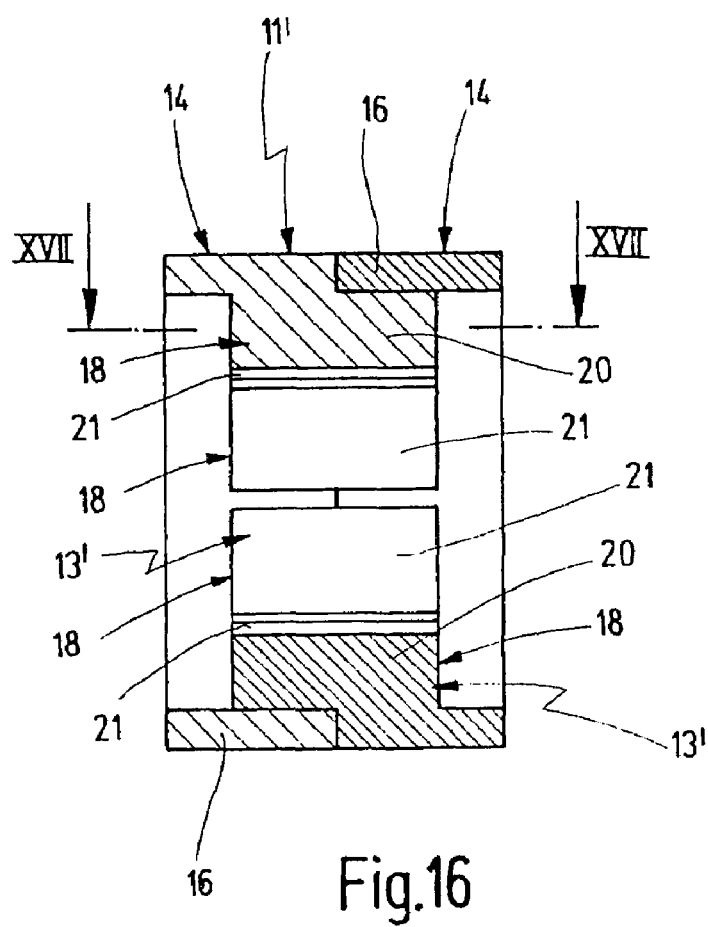
FIG. 16, a section taken along the line XVI-XVI in FIG. 15.

In FIG. 8, of the two identical outer modules 14 and the two identical intermediate modules 15, one of each is shown in perspective. FIGS. 9 and 10 show the outer module 14 in an end view and in longitudinal section, respectively. FIGS. 11 and 12 show the intermediate module 15 in an end view and in a longitudinal section, respectively.

Figure 17:
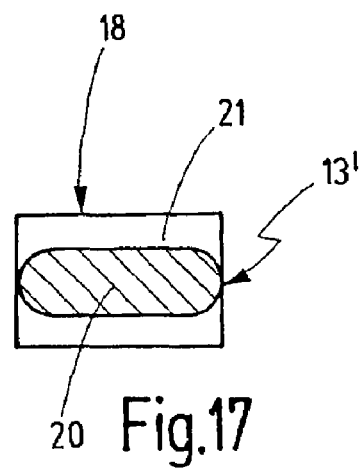
FIG. 17, a section of a tooth of the stator taken along the line XVII-XVII in FIG. 16.

As noted above, the outer module 14 has three module teeth 18, offset from one another on the inner wall of the short-circuit segment 16 by equal circumferential angles, and they are embodied integrally with the short-circuit segment 16. Each module tooth 18 has a tooth neck or tooth shaft 20 and a tooth shoe 21, which is located on the end of the tooth shaft 20 remote from the short-circuit segment 16 and protrudes past the tooth shaft 20 on the long sides, remote from one another and extending in the axial direction, of the tooth shaft 20, or in other words in the circumferential direction. The tooth shoes 21 have the same axial length as the tooth shafts 20. The tooth shafts 20 are rounded on their face ends, as can be seen in FIG. 17. The tooth shafts 20 and tooth shoes 21 protrude on one side past the short-circuit segment 16 by a portion of their axial length, in this example half the axial length. The number of module teeth 18 is half as large as the total number of teeth 13 on the short-circuit ring 12 of the SMC body 11.

Figure 4:
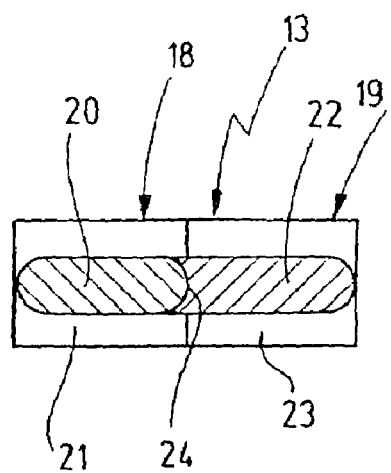
FIG. 4, a section of a tooth of the stator along the line IV-IV in FIG. 3.

In FIGS. 11 and 12, the intermediate module 15 is shown in an end view and in longitudinal section, respectively. Once again, on the short-circuit segment 17, the three module teeth 19 are offset from one another by equal circumferential angles and formed integrally onto the inner wall of the short-circuit segment 17. The number of module teeth 19 is half as large as the total number of teeth 13 on the short-circuit ring 12 of the SMC body 11. In the same way as for the outer module 14, each module tooth 19 has a tooth neck or tooth shaft 22 and a tooth shoe 23, which are embodied in the same way as for the module teeth 18 of the short-circuit segment 16. The module teeth 19, which have the same axial length as the module teeth 18, however protrude with a greater axial length past the face end of the short-circuit segment 17, so that the transitional area from the tooth shaft 22 to the short-circuit segment 17 is smaller than for the outer module 14. The face ends, located outside the short-circuit segment 17, of the tooth shafts 22 are rounded—like the tooth shafts 20 of the module teeth 18 on the outer module 14. The face ends, located inside the short-circuit segment 17, of the tooth shafts 22 are each provided with a concave indentation 24, which has the same radius of curvature as the rounded portions of the tooth shafts 22 on the other face end of the tooth shafts 22 and on the face ends of the tooth shafts 20 in the outer module 14. The tooth shoes 23 on the face end of the tooth shafts 22 that have the indentation 24 are shortened, compared to the tooth shafts 22, and extend only as far as the lowermost point of the indentation 24, as can be seen in FIG. 12 and also in FIG. 4.

Figure 5:
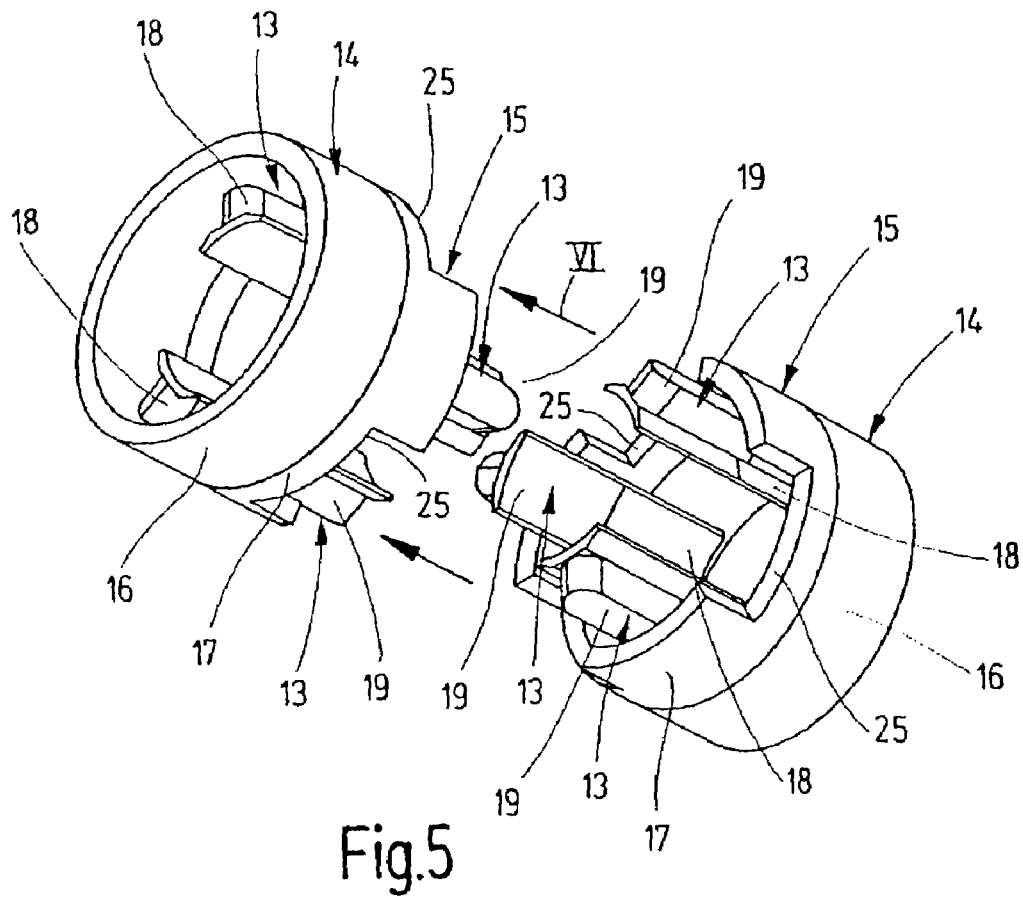
FIG. 5, an exploded view of the stator in FIG. 1, divided in two in the middle, in which each stator half includes two modules of different design.
Figure 6:
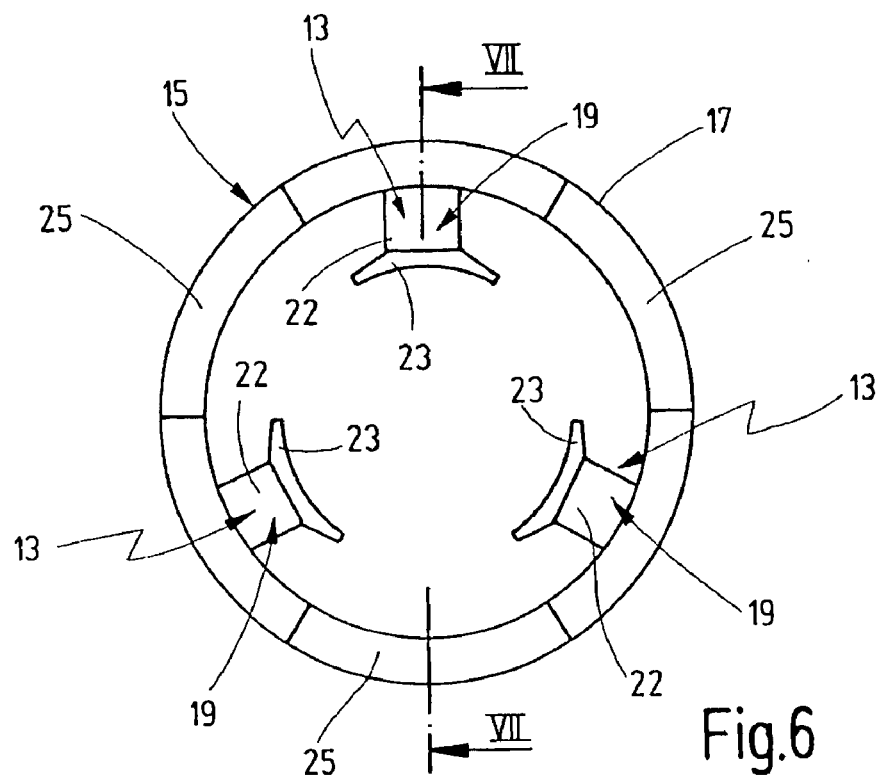
FIG. 6, an end view of one stator half in the direction of the arrow VI in FIG. 5.
Figure 7:
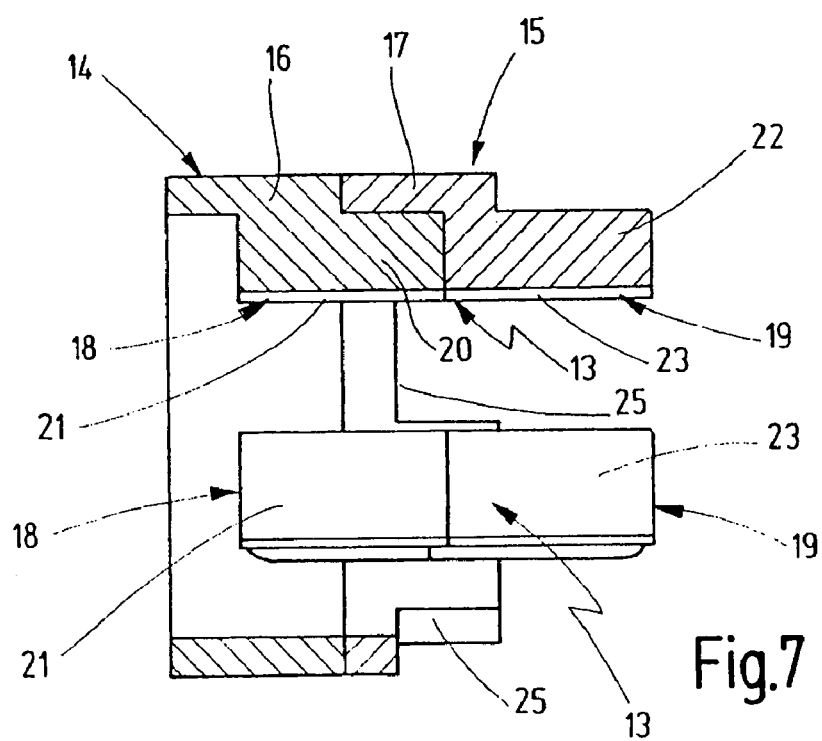
FIG. 7, a section taken along the line VII-VII in FIG. 6.

As can be seen from FIGS. 8 and 12, the short-circuit segment 17 of the intermediate module 15 has three recesses 25, offset from one another by equal circumferential angles, which are introduced from the face end of the short-circuit segment 17 at which the module teeth 19 protrude. The recesses 25 have equal dimensions in both the axial direction and the circumferential direction. They are located centrally between the module teeth 19. As shown in FIG. 5, the recesses 25 receive the regions of the short-circuit segment 17 of the other intermediate module 15 that carry the module teeth 19. This assures on the one hand that a sufficiently large connection area is available between the short-circuit segment 17 and the module tooth 19, and on the other, that a torsionproof connection exists between the intermediate modules 15 placed against one another.

In production of the modules 14, 15 by axial pressing of the SMC powder, in order—as described at the outset—to make the required aspect ratio as high as possible, the axial length of the short-circuit segments 16, 17, given a radial thickness of the short-circuit segments 16, 17 of 6 mm, as an example, is selected to be approximately 25 mm, resulting in an aspect ratio of approximately 1:4. At the critical points of the modules 14, 15, namely at the relatively thin tooth shoes 21, 23 with a radial thickness of approximately 2 mm, there is thus still an aspect ratio of approximately 1:12, which is within the tolerance range.

For producing the SMC body 11 shown in FIGS. 1 through 3, two outer modules 14 and two intermediate modules 15 are lined up axially against one another—as already described. To that end, first—as is shown in FIG. 8—one intermediate module 15 is placed axially against one outer module 14, in such a way that the module teeth 18 and 19 are aligned with one another. At the end of the attachment motion, represented by the arrows, the rounded portions of the module teeth 18 penetrate the indentations 24 of the module teeth 19, and the tooth shoes 21 and 23 rest as flatly against one another as the end faces, facing toward one another, of the short-circuit segments 16 and 17. Because of the tooth shafts 20 penetrating the indentations 24 of the tooth shafts 22, rotation of the two modules 14, 15 relative to one another is prevented, which makes it easier to mount the annular coils on the teeth 13 that are put together from the module teeth 18, 19. Each tooth 13 of the SMC body 11 is formed in the axial direction half of one module tooth 18 and half of one module tooth 19. One annular coil 101 of the stator winding 10 is now wound onto each tooth 13, as schematically indicated in FIG. 2.

Two such components of the SMC body 11, which are each composed of one outer module 14 and one intermediate module 15 and each has half the total number of teeth 13 and correspondingly half the total number of annular coils 101 of the stator winding 10, are put together axially to make the SMC body 11 with the stator winding 10; before they are joined together, one component comprising an outer module 14 and intermediate module 15 is rotated 180° in the plane in which the module axes are located, counter to the other component comprising an outer module 14 and an intermediate module 15, so that the two intermediate modules 15 face toward one another, as is shown in perspective in FIG. 5. In addition, one outer module 14 and the intermediate module 15 thus rigidly joined to it is rotated counter to the other outer module 14 and the intermediate module 15 thus rigidly joined to it, by an angle in the circumferential direction such that the teeth 13 of the one component of the SMC body 11 face a gap between the teeth 13 of the other component of the SMC body 11. In the version of the SMC body 11 with six teeth 13 shown, the angle of rotation is 60°. In general, the angle of rotation is 360°/N, where N is the total number of teeth 13 present on the SMC body 11. The two components of the SMC body 11 are inserted into one another axially in the direction of the arrow in this orientation, as can also be seen in FIG. 5, and in alternation, the regions or portions of the short-circuit segments 17 of one intermediate module 15 that carry the module teeth 18 penetrate the recesses 25 in the respective other intermediate module 15 by positive engagement. At the end of the joining operation, the stator shown in FIG. 1 in perspective and in FIG. 3 in longitudinal section, in each case shown without a stator winding 10, is the result.

The above-described construction of the SMC body 11 has the additional advantage that without structural and manufacturing modifications, an electrical machine, in particular a DC motor, of the same type with a shortened axial length can be attained. To that end—as is shown in FIGS. 13 through 16—the two intermediate modules 15 between the outer modules 14 are omitted, and the outer modules 14 are joined together directly in the axial direction represented by the arrows in FIG. 13. The two outer modules 14 are oriented in the same way as described above, so that their face ends from which the module teeth 18 protrude axially face toward one another, and the module teeth 18 in one outer module 14 face a gap between module teeth 18 in the other outer module 14. Before the outer modules are joined together, the annular coils of the stator winding are wound onto the module teeth 18 of both outer modules 14. The assembled SMC body 11 with an axially shortened length is shown in perspective in FIG. 14, in end view in FIG. 15, and in longitudinal section in FIG. 16. The short-circuit segments 16 of the two outer modules 14, pressed against one another and joined together in a manner fixed against relative rotation, form the short-circuit ring 12' of the axially shortened stator, and one module tooth 18 of each of the two outer modules 14 forms one tooth 13' of the axially shortened stator. Since in the exemplary embodiment each outer module 14 has three module teeth 18, the result again is the total number of six teeth 13' on the shortened stator.

The invention is not limited to the stator for an internal rotor machine described as an example. In the same way, a stator for an external rotor machine can be constructed. The assembly according to the invention of the SMC body can also be employed with rotors for electrical machines, with the same advantages.

The foregoing relates to a preferred exemplary embodiment of the invention, it being understood that other variants and embodiments thereof are possible within the spirit and scope of the invention, the latter being defined by the appended claims.

The invention claimed is:

1. In a main element usable as a rotor or stator for an electrical machine, in particular for a small DC motor, having a magnetically conductive body, which has a short-circuit ring and radially protruding teeth formed integrally onto the short-circuit ring, which teeth are offset from one another about circumferential angles, the improvement wherein the body comprises a plurality of separately manufactured modules, placed axially aligned against one another, of which two modules are embodied identically and on being placed against one another are rotated counter to one another by 180° in the plane defined by the module axes, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the body, and wherein each module tooth has a tooth shaft that is rounded at the face end; and wherein there are intermediate modules, and the module teeth of the intermediate modules, the face ends of the tooth shafts that abut the module teeth of the outer modules have concave indentations which fit by positive engagement over the rounded portions on the face ends of the tooth shafts of the outer modules.

2. The main element as defined by claim 1, wherein the body is made from SMC material.

3. The main element as defined by claim 2, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the SMC body.

4. The main element as defined by claim 2, comprising two identical modules disposed on the outside as outer modules and two identical modules disposed between the outer modules as intermediate modules, the body having a total of four modules.

5. The main element as defined by claim 3, wherein the number of module teeth on each module is half as large as the number of teeth of the SMC body.

6. The main element as defined by claim 1, comprising two identical modules disposed on the outside as outer modules and two identical modules disposed between the outer modules as intermediate modules, the body having a total of four modules.

7. The main element as defined by claim 6, wherein the two identical outer modules are shaped such that when the two intermediate modules are removed, the two outer modules can be joined together into an axially shortened body.

8. The main element as defined by claim 7, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the body.

9. The main element as defined by claim 8, wherein the number of module teeth on each module is half as large as the number of teeth of the body.

10. The main element as defined by claim 6, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the body.

11. The main element as defined by claim 10, wherein the number of module teeth on each module is half as large as the number of teeth of the body.

12. The main element as defined by claim 1, wherein each module tooth on the end facing away from the short-circuit segment has a tooth shoe which protrudes in the circumferential direction past the tooth shaft on both sides and has the same axial length as the tooth shaft; and wherein in the module teeth of the intermediate modules, one face end of the tooth shoes is set back as far as the lowermost point of the indentation on the tooth shaft.

13. In a main element usable as a rotor or stator for an electrical machine, in particular for a small DC motor, having a magnetically conductive body, which has a short-circuit ring and radially protruding teeth formed integrally onto the short-circuit ring, which teeth are offset from one another about circumferential angles, the improvement wherein the body comprises a plurality of separately manufactured modules, placed axially aligned against one another, of which two modules are embodied identically and on being placed against one another are rotated counter to one another by 180° in the plane defined by the module axes, the body comprising two identical modules disposed on the outside as outer modules and two identical modules disposed between the outer modules as intermediate modules, the body having a total of four modules, and wherein the two identical outer modules are shaped such that when the two intermediate modules are removed, the two outer modules can be joined together into an axially shortened body.

14. The main element as defined by claim 13, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the body.

15. The main element as defined by claim 14, wherein the number of module teeth on each module is half as large as the number of teeth of the body.

16. The main element as defined by claim 15, wherein one intermediate module on each outer module is attached in such a way that the module teeth abut one another in axially aligned fashion; and wherein the outer modules with the attached intermediate module are rotated about their module axes relative to one another by an angle of 360°/N, where N is the number of teeth of the body.

17. The main element as defined by claim 14, wherein one intermediate module on each outer module is attached in such a way that the module teeth abut one another in axially aligned fashion; and wherein the outer modules with the attached intermediate module are rotated about their module axes relative to one another by an angle of 360°/N, where N is the number of teeth of the body.

18. In a main element usable as a rotor or stator for an electrical machine, in particular for a small DC motor, having a magnetically conductive body, which has a short-circuit ring and radially protruding teeth formed integrally onto the short-circuit ring, which teeth are offset from one another about circumferential angles, the improvement wherein the body comprises a plurality of separately manufactured modules, placed axially aligned against one another, of which two modules are embodied identically and on being placed against one another are rotated counter to one another by 180° in the plane defined by the module axes, comprising two identical modules disposed on the outside as outer modules and two identical modules disposed between the outer modules as intermediate modules, the body having a total of four modules wherein the short-circuit segments of the two intermediate modules have recesses, offset from one another by equal circumferential angles, with equal dimensions in the axial and circumferential direction, which recesses are introduced from the particular face end of the short-circuit segments past which the module teeth protrude axially; and wherein the recesses are disposed centrally between the module teeth.

19. In a main element usable as a rotor or stator for an electrical machine, in particular for a small DC motor, having a magnetically conductive body, which has a short-circuit ring and radially protruding teeth formed integrally onto the short-circuit ring, which teeth are offset from one another about circumferential angles, the improvement wherein the body comprises a plurality of separately manufactured modules, placed axially aligned against one another, of which two modules are embodied identically and on being placed against one another are rotated counter to one another by 180° in the plane defined by the module axes, wherein the modules each have one annular short-circuit segment forming an axial portion of the short-circuit ring, and an equal number of module teeth offset by equal circumferential angles on the short-circuit segment and protruding axially unilaterally past the short-circuit segment which teeth, when the modules are put together form the teeth of the body, and wherein there are at least two intermediate modules, and the short-circuit segments of the at least two intermediate modules have recesses, offset from one another by equal circumferential angles, with equal dimensions in the axial and circumferential direction, which recesses are introduced from the particular face end of the short-circuit segments past which the module teeth protrude axially; and wherein the recesses are disposed centrally between the module teeth.

* * * * *